BEST AVAILABLE COPY

No. 12,592. REISSUED JAN. 8, 1907.

H. P. TAYLOR.

ORE CONCENTRATOR.

APPLICATION FILED JULY 28, 1903.

2 SHEETS—SHEET 1.

WITNESSES

Edwin P. Rea

H. C. Wayne

INVENTOR

Harry P. Taylor

By H. H. Bliss

Attorney

BEST AVAILABLE COPY

No. 12,592. REISSUED JAN. 8, 1907.

H. P. TAYLOR.

ORE CONCENTRATOR.

APPLICATION FILED JULY 28, 1903.

2 SHEETS—SHEET 2.

WITNESSES

Edwin P. Rea

H. C. Haynes.

INVENTOR

Harry P. Taylor,

By H. H. Bliss.

Attorney

BEST AVAILABLE COPY

UNITED STATES PATENT OFFICE.

HARRY PICOTTE TAYLOR, OF HOWARD, OREGON, ASSIGNOR OF ONE-FOURTH TO W. P. KEADY, OF HOWARD, OREGON.

ORE-CONCENTRATOR.

No. 12,592. Specification of Reissued Letters Patent. Reissued Jan. 8, 1907.

Original No. 682,371, dated September 10, 1901. Application for reissue filed July 28, 1903. Serial No. 167,360.

*To all whom it may concern:*

Be it known that I, HARRY PICOTTE TAYLOR, a citizen of the United States, residing at Howard, in the county of Crook and State of Oregon, have invented certain new and useful Improvements in Ore-Concentrators, of which the following is a specification.

My invention relates to improvements in concentrating-tables whereupon ores are separated from the refuse tailings and from each other according to their specific gravities.

It consists, essentially, of a longitudinally-inclined support, a transversely-inclined bed upon this support, means by which these inclines may be varied, a shaking-table upon this bed, means by which a movement is given to this table oblique to the longitudinal line of the support, means by which the length of this movement or stroke may be regulated, and of details more fully explained by reference to the following specification and accompanying drawings.

Figure 1:
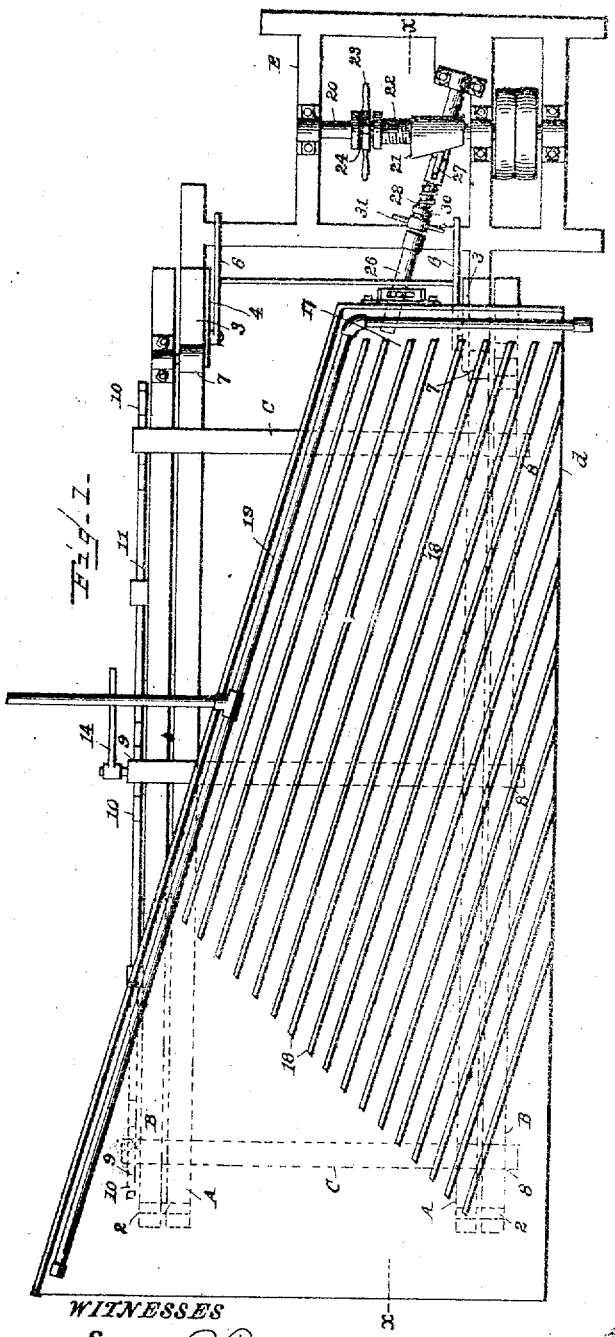
Figure 2:
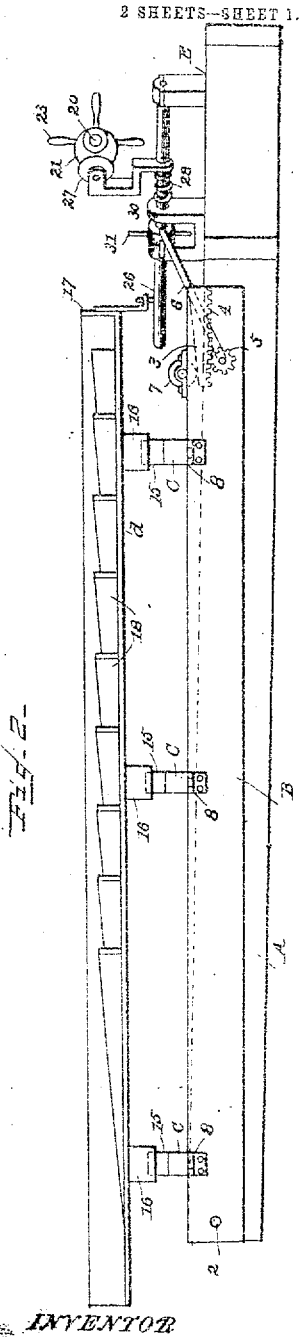
Figures 3, 4, 5, 6, 7:
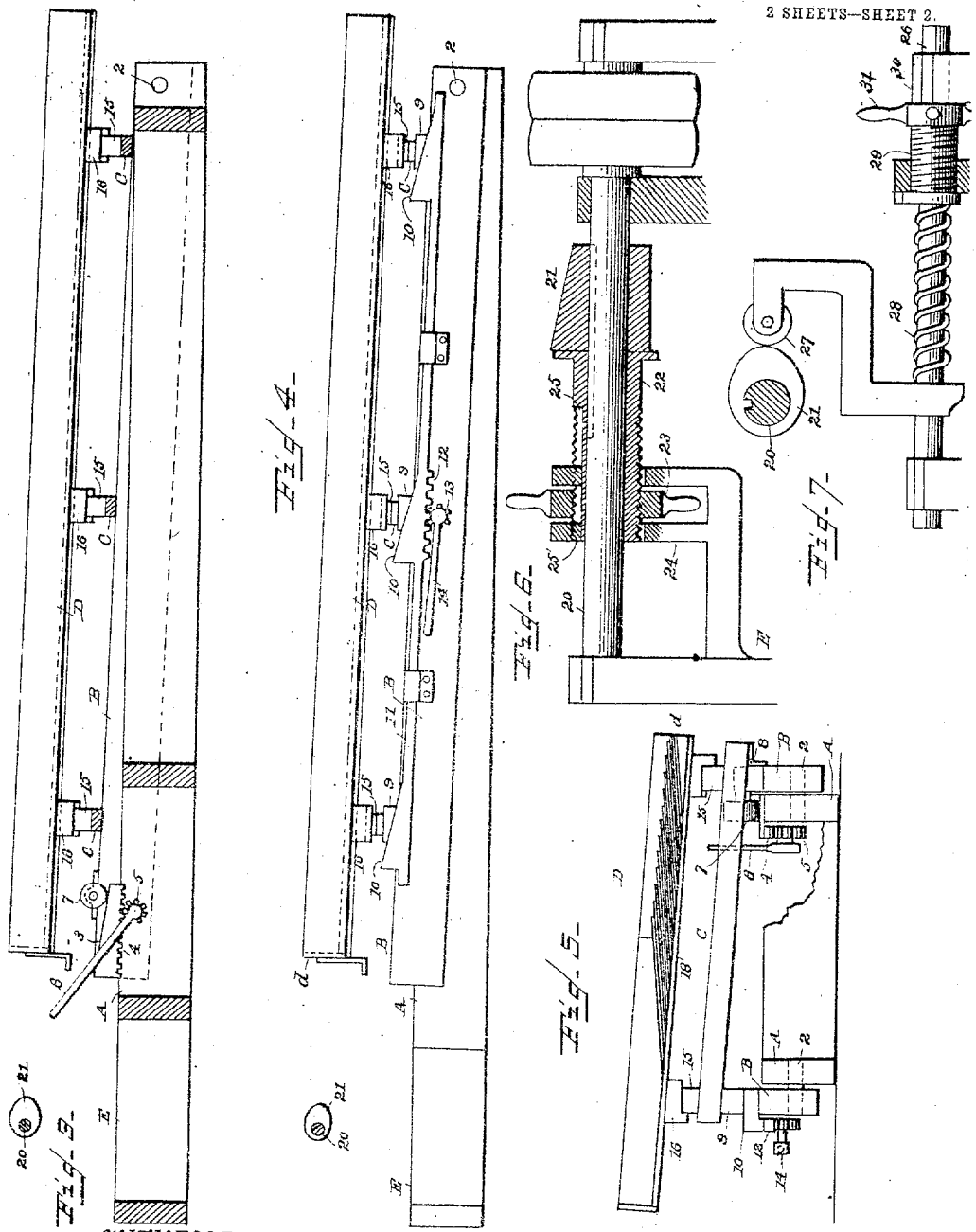

Figure 1 is a plan of my invention. Fig. 2 is a longitudinal elevation. Fig. 3 is a part section and elevation on the line *x x* of Fig. 1. Fig. 4 is a rear elevation. Fig. 5 is an end view. Figs. 6 and 7 are detail views of the driving mechanism.

The object of my invention is to provide a device in which I get the widest range of position and movement possible for the concentrating-table as may be best adapted to the varying kinds and grades of ores under treatment. It is capable of being given a longitudinal, a transverse, and a diagonal tilt at one and the same time, or it may be given any of these tilts singly, or it may remain horizontal, and in any of these positions the movement or length of stroke of the table is capable of variation at will.

Having reference to the drawings, A is a suitable foundation or base on which the mechanism is supported. A frame B, composed of longitudinal timbers suitably connected, is pivoted at one end, as at 2, to the base A, so as to be capable of being given a longitudinal tilt. This tilting is effected by an inclined-plane lifting mechanism secured upon the parts of the base and the frame, near the opposite end from the pivot 2, as follows: On each of the longitudinal pieces of the base A are similar sliding wedges 3, having projecting flanges by which their position on these pieces is maintained. One of these flanges of each wedge is notched to form a rack-bar 4. A pinion 5, having an axle journaled in the base, engages with the rack and by suitable means, as a lever 6, is operated to move the wedge. Secured upon the frame B are rollers 7, which are adapted to engage the inclined faces of the wedges 3. A simultaneous movement of the levers moves the wedges forward or backward and correspondingly raises or lowers the end of the frame. A bed portion C is hinged at 8 to the frame B. By means of these hinges the bed C is transversely tilted by a mechanism somewhat similar to that used in giving the frame its longitudinal tilt. Upon the opposite side of the bed from the hinges are the wedge portions 9, fitted so as to slide upon the inclines 10, carried upon a rod 11, which latter is secured to the longitudinal portion of the frame B. The under side of this bar is provided with a rack 12, and a pinion 13, journaled in the frame, engages this rack and is actuated as by means of a lever 14. Thus by means of the lever 14 the wedges 10 are simultaneously moved and the lateral tilt of the bed and the table varied. The shaking or concentrating table D is supported above the bed in such manner that it may be given a rocking or sliding movement in a direction oblique to the length of the machine. Such mounting I have shown by the standards 15 upon the bed, having their ends adapted to fit the cleats 16 on the bottom of the table and form sliding bearing-surfaces. The table is of irregular shape, having its "head" end narrowed. The pulp is fed in, as at 17. Parallel with the longer and outer edge of the table are the riffles 18, which may be either rectangular or otherwise formed in any well-known manner. Water is fed along the side and end of the table from the trough or perforated pipe 19. The object of making this table with its outer edge longer is to compensate in a manner for the longitudinal tilting of the table and to raise that edge of the concentrate end which would naturally be lower, so that the water may tend to flow toward the head and be equally distributed over the table. Furthermore, for reasons soon to be shown, the valuable particles or the "concentrates" will be carried "uphill" toward the concentrate or broad end of the table by means of the riffles and the shaking of the table, while the slime will flow off on

BEST AVAILABLE COPY the lower or "tailings" side *d*. A differential reciprocating movement in the direction of the riffles is given to this table in the following manner: At the head end of the machine a horizontal shaft 20 is journaled in a framework E and has suitable driving connections with a source of power. Upon this shaft is a cone-shaped cam 21. A sleeve 22 upon the shaft has one end abutting against the base of the cam and the other end is threaded, on which the stroke-adjuster 23 is turnable. This adjuster is held between the guides 24 on the framework E. The sleeve 22 is prevented from turning on the shaft by means of a longitudinal groove 25 in the sleeve, in which a projection or lug 25′ on the frame engages. To the head of the table is attached an arm 26. The outer end of this arm has a wheel 27 running on the face of the cam. This wheel is kept against the cam by reason of a spring 28. The tension of this spring is regulated by a flanged sleeve 29 upon the arm. This sleeve is exteriorly threaded and is turnable in a threaded projection 30 of the framework E and is operated by means of the spokes 31. By means of the movable sleeve 22 upon the shaft 20 acting against the cam to move the latter, so the wheel 27 runs upon a greater or less circumference of the cam, I am able to give any desired length of stroke or "shake" to the table. This ability to change the shake of the table is of great value in many instances. The cam is given such a periphery that a differential movement is gained—*i. e.*, the table comes to a quick stop on the concentrate end of its stroke and to a gradual stop at the other end. As previously indicated, the table is capable, further, through means of the inclined wedges, of being given a longitudinal tilt and a transverse tilt. These features, coupled with the oblique shaking movement, gives a differential motion to the table, which, with the angle of the riffles, throws the valuable particles toward the concentrate end of the table and effects a cleaner and closer saving than is usual in concentrating-tables, this by reason that the slime is carried in another direction—*i. e.*, toward the lower side *d*—and the particles have more freedom to separate according to their relative specific gravities. Furthermore, it has been found that by the use of this machine the finely-ground ore may be concentrated in a dry state—a feature that is of immense value in dry and arid localities where conservation of water is of first importance in all operations.

Having thus described my invention, what I claim as new, and desire to secure by Letters Patent, is—

1. In a concentrator, the combination of a longitudinally and transversely inclined support, and a table mounted thereon, said table being of irregular shape with a narrowed head end, riffles upon the table arranged parallel with the outer or longer side thereof and diagonal to the said support, and means by which the table is given an endwise-reciprocating movement oblique to longitudinal axis of the machine, and in the line of said riffles.

2. In a concentrator, the combination with a base of a frame pivoted thereon, means by which the frame may be inclined longitudinally, a bed hinged on this frame and capable of being given an incline transverse to the frame, a table upon this bed, said table being of irregular shape and diverging from its head end, and having riffles parallel with its outer or long side and diagonal to the bed, and means by which the table may be given an endwise-reciprocating movement oblique to the longitudinal axis of the machine, and in the line of the riffles.

3. In a concentrator, a table having a narrow head end, and gradually increasing in width toward the foot having parallel riffles extending in a line oblique to the longitudinal axis of the table and parallel with the longer or outer side of the table, and means by which this table may be given a reciprocating movement in the line of these riffles.

4. In a concentrator, the combination with a base, of a frame pivoted at one end thereon, inclined wedges slidable upon the base, bearing-surfaces fixed upon the frame which engage these wedges, and means by which the wedges are moved and the frame given a longitudinal tilt, a bed hinged upon the frame, and means by which the bed is laterally tilted, a table carried upon the bed having parallel riffles oblique to the axis of the machine, and extending in uphill direction, and means by which the table is given a reciprocating movement in the direction of the riffles.

5. The combination with a concentrator table and means by which it may be longitudinally and transversely tilted, means whereby this table may be differentially reciprocated obliquely to the longitudinal axis of the table, said means consisting of a shaft, a cone-shaped cam slidable upon this shaft, a sleeve upon the shaft and also slidable thereon, and abutting against the base of the cone, said sleeve having exterior threads, a nut thereon held between guides by which the sliding movement of the sleeve on the shaft is effected, and the cam moved, and means whereby the sleeve is kept from turning, an arm upon the head of the table and carrying a wheel which runs on the periphery of the cam, means by which the contact of the wheel against the cam is maintained.

6. The combination in a concentrator of a longitudinally-tilted frame, and means by which this tilt may be varied, a transversely-tilted bed upon this frame and means whereby its tilt may be varied, a table mounted thereon having one side inclined outward

BEST AVAILABLE COPY from the axis of the machine and in the direction of the foot end of the table, means by which water is fed to the table along this longer outer edge, riffles parallel with this longer edge, and means by which this table is given a differential reciprocating movement in the direction of the riffles and whereby the concentrates are made to travel "uphill" upon the table.

7. In an ore-concentrator, the combination with a longitudinally and transversely tilted table, said table having its outer and upper edge divergent from the axis of the machine, riffles of graduated lengths parallel with this upper edge and diagonal to the head end, and means whereby this table is given a differential reciprocating movement in the direction of this upper edge.

8. In an ore-concentrator, the combination of a table carrying a series of parallel riffles, the table being transversely adjustable about an axis which is situated in a longitudinal vertical plane, and also longitudinally adjustable about an axis that is situated in a transverse vertical plane, such adjustments being adapted to bring the surface of the table into different planes relative to the horizontal, and the said riffles being arranged in a direction oblique or inclined to the said longitudinal and transverse vertical planes, and means for imparting reciprocatory movements to the table on lines parallel with the riffles, substantially as set forth.

In testimony that I claim the above I have hereunto subscribed my name in the presence of two witnesses.

HARRY PICOTTE TAYLOR.

Witnesses:

A. B. KOHNY,

R. J. MCAFEE.